Figure 1:
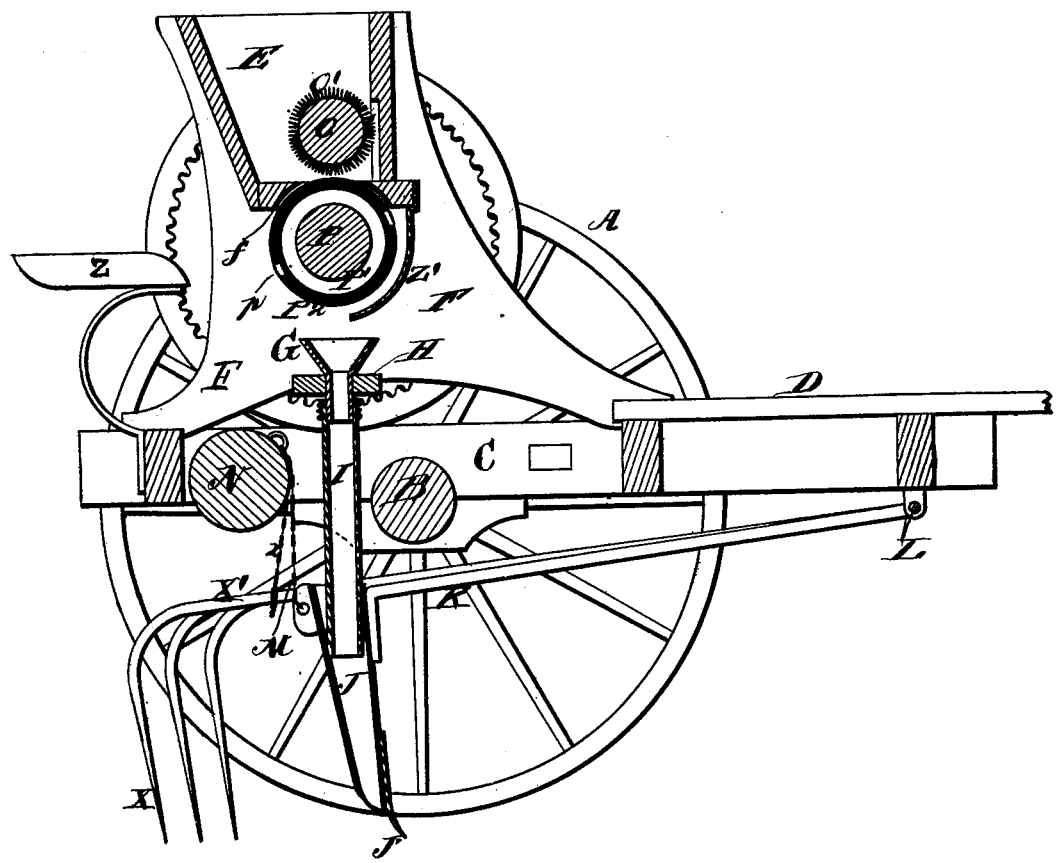

L. E. WILLIAMS.
CORN-PLANTERS AND CULTIVATORS.

No. 190,944. Patented May 15, 1877.

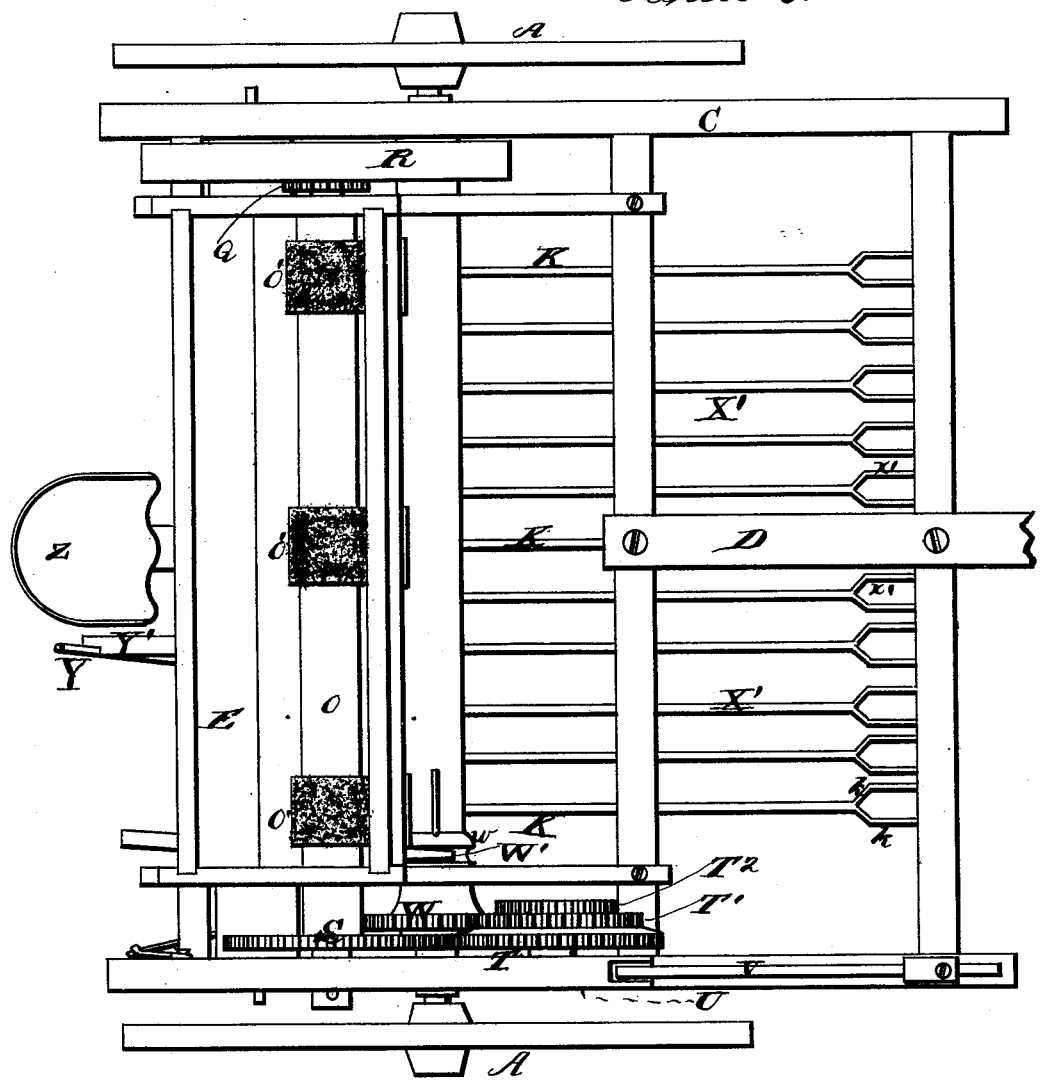

UNITED STATES PATENT OFFICE.

LEVI E. WILLIAMS, OF MANQUIN, VIRGINIA.

IMPROVEMENT IN CORN-PLANTERS AND CULTIVATORS.

Specification forming part of Letters Patent No. 190,944, dated May 15, 1877; application filed February 10, 1877.

*To all whom it may concern:*

Be it known that I, LEVI E. WILLIAMS, of Manquin, in the county of King William and State of Virginia, have invented a new and valuable Improvement in Corn-Planters and Cultivators; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a central vertical section of my cornplanter and cultivator, and Fig. 2 is a plan view thereof.

This invention relates to improvements in the feed-cylinder of corn-planters; and it consists in providing the feed-cylinder of a cornplanter with an elastic sheath having seed-pockets, whereby the crushing of the seed while delivering it is prevented, as will be hereinafter more fully set forth.

In the accompanying drawings, A designates the two transporting-wheels of my cornplanter and vehicle, and B the axle of the same. On said axle rests main frame C of the vehicle, to which is secured a draft-tongue or pole, D. E designates a seed box or hopper, extending nearly across the frame C, and supported above the same by standards F F. Said seed-box has openings $f$ at its bottom, through which the corn passes to funnels G, that are supported by cross-bar H, which is rigidly attached to said standards F F. Said funnels extend down through said cross-bar, and conduct the grain to flexible tubes I, which are attached to their lower ends. Said flexible tubes I conduct the said grain to rigid planting or dropping tubes or spouts, J, which are attached to the rear ends of long arms or rods K, which are pivoted in front on a cross-rod, L, detachably secured to the under side of frame C. The said spouts are suspended, by means of chains M, from a cylinder or large shaft, N, which is journaled transversely in the rear part of said frame C. By rotating said shaft or cylinder N, as hereinafter described, the said dropping-spouts J may be adjusted up out of engagement with the surface of the ground, the flexible tubes I yielding to allow such adjustment. The lower end of each dropping-spout J is provided with a planting-shovel, J', which makes the furrow for the reception of the corn.

The corn is fed to the foregoing planting devices by means of the following apparatus: O designates a shaft, journaled in the sides of seed-box E, and provided with small brush feeding-cylinders O', which turn above openings $f$ in said box E. P designates another shaft, journaled in standards F F, and provided with dropping-cylinders $P^1$, arranged, respectively, under the feeding-cylinders O. Said cylinders $P^1$ are provided with india-rubber sheaths or envelopes $P^2$ on their periphery, (to prevent the grains of corn from being crushed between cylinders O' and $P^1$,) and with pockets $p$, which transfer the grain from the seed-box E to the funnels, flexible tubes, and dropping-spouts hereinbefore described. Said shafts O and P are turned in opposite directions by means of the following devices: Q designates a pinion on one end of shaft O, which pinion engages with an internally-geared wheel, R, on the corresponding end of shaft P. The other end of said shaft P is provided with a spur-gear wheel, S, which meshes with a similar wheel, T, that turns on a short shaft fixed to a bar, U, said bar being pivoted near the middle on shaft P. The lower front end of said bar U is held down by the pressure of a spring, V, which is detachably secured to frame C. To the inner face of spur-wheel T is rigidly attached a smaller similar wheel, $T^1$, and to the inner face of this latter wheel a still smaller one, $T^2$, is likewise attached. W designates a gear-wheel feathered on axle B, and adapted to slide laterally thereon. Said gear-wheel W engages with one or the other of said wheels $T^1$ $T^2$, according to the degree of its lateral adjustment. This shifting is effected by means of a shifting-lever, W, which has a downwardly-extending finger, that engages with a grooved pulley or clutch, $w$, connected to said shifting-wheel W. The said adjustment regulates the rapidity of the revolutions of shafts O and P, and, consequently, the hills of corn. Spring V yields sufficiently to allow wheel $T^1$ to be thus engaged by wheel W; but as soon as the latter is shifted inward, the said spring forces wheel $T^2$ into similar engagement therewith. As bar U is pivoted upon the same shaft which carries wheel S, the upward and downward tippings of the front end of said bar, conforming to said adjustments, will not separate said wheels S and T. The engagement of the entire train of gearing thus continues unbroken.

X designates a number of cultivator teeth or plows, which are formed upon the downwardly-bent rear ends of beams or draft-bars X', which are pivoted in front to rod L, already described. The said bent rear ends of said bars are suspended by chains X from cylinder N, already described, which cylinder is provided with an adjusting-arm, Y, that may be locked in its most rearward position by means of a stop-plate, Y', notched to receive said arm, and extending backward from the rear of grain-box E. By thus turning this arm backward and locking it, the dropping-spouts and cultivator-teeth already described are all raised out of engagement with the surface of the ground.

Each bar K is provided with two front diverging spring-arms, $k$ $k$, and each bar X' is provided with two similar spring-arms, $x'$ $x'$. By means of these spring-arms $k$ and $x'$ the said bars K and X' are pivoted to said cross-rod L. Said spring-arms may be compressed or allowed to expand, thus adapting the machine to plant a greater or a less width, as preferred. The cultivator points or shovels X may be arranged in any convenient manner to yield on coming in contact with stones, roots, &c., and a cord or chain may be carried up from each of them to the rear of grain-box E, so that the driver, sitting on seat Z, may raise and free any one of the said plow points or shovels X without stopping the machine.

Z' designates several curved metal guide-plates, one of which is secured to the bottom of feed-box E, in front of each opening $f$, and curves around each cylinder $P^1$, so as to prevent any of the grain from escaping before reaching the funnels below. Pockets $p$, already described, need not extend into cylinders $P^1$, but may be made simply in the rubber envelopes thereof.

I do not claim, broadly, elastic feed-cylinders, for such, I am aware, are not new; but

What I claim as new is—

The feed-cylinder $P^1$, provided with an elastic sheath, $P^2$, having seed-pockets $p$, to prevent crushing the seed while delivering the same, substantially as described.

In testimony that I claim the above I have hereunto subscribed my name in the presence of two witnesses.

LEVI E. WILLIAMS.

Witnesses:
  D. D. KANE,
  LEWIS A. HAINES.